US006721678B1

(12) United States Patent
Zhang et al.

(10) Patent No.: US 6,721,678 B1
(45) Date of Patent: Apr. 13, 2004

(54) DETERMINING THREE DIMENSIONAL VELOCITY OF A OBJECT

(75) Inventors: Guifu Zhang, Erie, CO (US); Jothiram Vivekanandan, Boulder, CO (US); Richard J. Doviak, Norman, OK (US)

(73) Assignee: University Corporation for Atmospheric Reserch, Boulder, CO (US)

( * ) Notice: Subject to any disclaimer, the term of this patent is extended or adjusted under 35 U.S.C. 154(b) by 0 days.

(21) Appl. No.: 10/029,491

(22) Filed: Dec. 20, 2001

Related U.S. Application Data

(60) Provisional application No. 60/260,821, filed on Jan. 10, 2001, and provisional application No. 60/258,124, filed on Dec. 26, 2000.

(51) Int. Cl.[7] .......................... G06F 15/00; G01S 13/00
(52) U.S. Cl. ........................................ 702/145; 342/26
(58) Field of Search .......................... 702/145; 703/5; 342/26

(56) References Cited

U.S. PATENT DOCUMENTS

| | | | | |
|---|---|---|---|---|
| 5,136,296 A | * | 8/1992 | Roettger et al. | 342/26 |
| 6,462,699 B2 | * | 10/2002 | Wurman et al. | 342/59 |
| 6,512,996 B1 | * | 1/2003 | Praskovsky et al. | 702/189 |

OTHER PUBLICATIONS

"Cross Correlations and Cross Spectra for Spaced Antenna Wind Profilers: Algorithms to Estimate Wind and Turbulence", Holloway et al., Radio Science, vol. 32, No. 3, May–Jun. 1997, pp. 967–982.*

"Cross Correlations and Cross Spectra for Spaced Antenna Wind Profilers: Theoretical Analysis", Doviak et al., Radio Science, vol. 31, No. 1, Jan.–Feb. 1996, pp. 157–180.*

"Cross Correlations and Cross Spectra for Spaced Antenna Wind Profilers: Algorithms to Estimate Wind and Turbulence", Holloway et al., Radio Science, vol. 32, No. 3, May–Jun. 1997, pp. 967–982.*

"Cross Correlations and Cross Spectra for Spaced Antenna Wind Profilers: Theoretical Analysis", Doviak et al., Radio Science vol. 31, No. 1, Jan.–Feb. 1996, pp. 157–180.*

"Validation of a UHF Spaced Antenna Wind Profiler for High–Resolution Boundary Layer Observations", Cohn et al., Radio Science, vol. 32, No. 3, May–Jun. 1997, pp. 1279–1296.*

Doviak, Richard J., Cross Correlations and Cross Spectra for Spaced Antenna Wind Profilers; Radio Science, vol. 31, No. 1, pp. 157–180, Jan.–Feb. 1996.

Holloway, Christopher L.; Cross Correlations and Cross Spectra for Spaced Antenna Wind Profilers 2. Algorithms to Estimate Wind and Turbulence, Radio Science, vol. 32, No. 3, pp. 967–982, May–Jun. 1997.

(List continued on next page.)

*Primary Examiner*—John Barlow
*Assistant Examiner*—Toan M Le
(74) *Attorney, Agent, or Firm*—Duft Setter Ollila & Bornsen LLC

(57) ABSTRACT

A velocity determination system determines a three dimensional velocity of an object wherein the three dimensional velocity comprises a radial velocity and a transverse velocity. A velocity determination system receives a first signal from the object. The velocity determination system then receives a second signal from the object. The velocity determination system then correlates the first signal and the second signal. The velocity determination system determines the radial velocity based on a ratio of the correlation of the first signal and the second signal. The velocity determination system then determines a transverse velocity based on a ratio of the correlation of the first signal and the second signal in a forward mode and a backward mode along a transverse direction.

45 Claims, 13 Drawing Sheets

OTHER PUBLICATIONS

Liu, C. H., "A model for Spaced Antenna Observational Mode for MST Radars," Radio Science, vol. 25, No. 4, pp. 551–563, Jul.–Aug. 1990.

Briggs, B. H., "Spaced–Antenna Analysis in the Frequency Domain," Radio Science, vol. 27, No. 2, pp. 117–129, Mar.–Apr. 1992.

Briggs, B. H., "Radar Observations of Atmospheric Winds and Turbulence: A Comparison of Techniques", Journal of Atmospheric and Terrestrial Physics, vol. 42, pp. 823–833, 1980 Department of Physics, University of Adelaide, South Australia.

Zhang, Guifu, "Detection and Imaging of Targets in the Presence of Clutter Based on Angular Correlation Function", a dissertation submitted to University of Washington 1998.

* cited by examiner

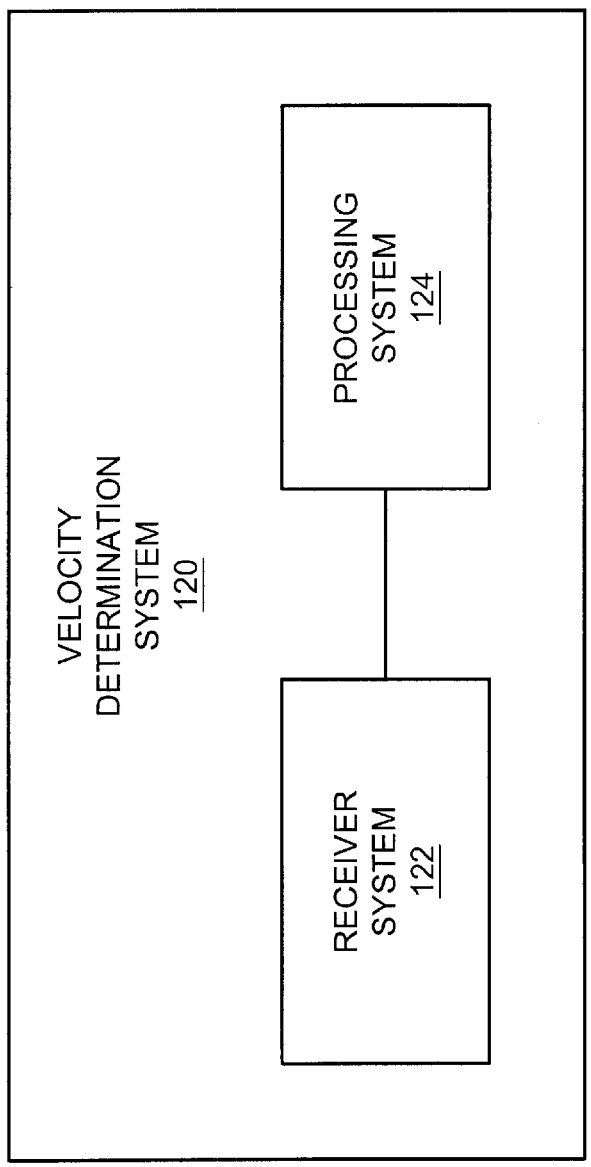
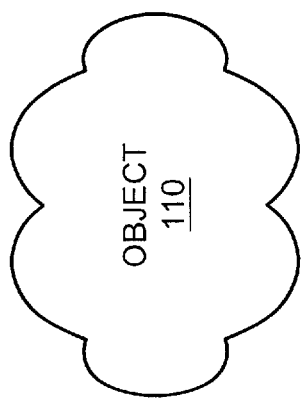
FIG. 1

(2+3, 1+4)

(2+1+4, 2+3+4)

(1+2, 3+4)

(1+2+3, 1+4+3)

DETERMINING THREE DIMENSIONAL VELOCITY OF A OBJECT

RELATED APPLICATIONS

This application claims the benefit of U.S. provisional application serial No. 60/258,124 filed Dec. 26, 2000 and U.S. provisional application serial No. 60/260,821 filed Jan. 10, 2001, which are hereby incorporated by reference.

BACKGROUND OF THE INVENTION

1. Field of the Invention

The subject matter of the present invention involves methods, software products, and systems that determine three dimensional velocity of an object. More particularly, the methods, software products, and systems determine radial and transverse velocities of the object.

2. Statement of the Problem

Some systems that measure the velocity of moving objects use the Doppler effect, where a change of frequency occurs depending on the motion of the object toward or away from the observer. The Doppler effect occurs in various forms of waves including sound, light, and electromagnetic waves. Doppler radar was developed during World War II to detect aircraft and other moving objects. Doppler radar has also been used in meteorological applications to measure precipitation and wind. In one meteorological application, mono-static Doppler radar measures the radial velocity of wind.

Other meteorological applications use Doppler radar to measure the velocity of wind. One example of a meteorological application is a multiple Doppler radar system, where two or more radar are directed towards a region from different directions. The Doppler radar systems then obtain the velocity of the wind from different directions and generate a two dimensional or three dimensional wind field. Unfortunately, using multiple Doppler radar systems is expensive. Also, synchronization between the multiple Doppler radar systems is difficult to achieve.

Another example is a bi-static radar network that includes one transmitter and at least two receivers placed at different angles. The multiple receivers obtain the velocity of wind from each of the receiver directions. Problems of the bi-static radar network include sidelobe, varying sample volume, and limited spatial coverage.

Another example is a Doppler beam swing (DBS) wind profiler. The DBS wind profiler points the radar beam in different directions and obtains the velocity in corresponding directions. One problem is the DBS wind profiler is only applicable to highly homogenous wind so that the different sample volume has the same wind. Unfortunately, wind is not necessarily homogenous.

Another method for determining velocity is the interferometry technique. The interferometry technique determines the transverse velocity from the interference effect of the scattered wave since the interference pattern moves with the scatterer's motion. In one example, the interferometry technique is understood as a change in correlation. If the sample volume follows the motion of the distributed scatterers, the correlation is maximum. Otherwise, the correlation of the scattered wave signal decreases. If the sample volume is in the opposite direction of the motion of the target distributed scatterers, the correlation is even less.

One example of the interferometry method is the spaced antenna (SA) system. In the SA system, multiple receivers are co-located with the transmitter. The SA system then processes the received signals to determine the cross-correlation function and the wind velocity. One prior system by Liu et al in 1990 relates the complex cross correlation to the wind and refraction index Δn statistics. Another prior system by Doviak et al in 1996 derives the cross-correlation function and extends it to a large class of Δn statistics.

One prior system by the National Center for Atmospheric Research is the Multiple Antenna Profiler (MAPR). The MAPR system includes 4 vertically pointing sub-arrays for reception and uses SA techniques to measure wind. The MAPR measures the motion of atmospheric echoes as the scatterers in the atmosphere move over the radar.

One processing method for obtaining the transverse wind is the full correlation analysis by Briggs et al in 1984. Another processing method is the intersection method by Doviak in 1994 and 1995. The intersection method estimates both auto-and cross-correlation functions. Another processing method is the cross/auto-correlation by Doviak et al in 1997. Another processing method is the slope at zero lag method by Lataitis et al in 1995. The slope at zero lag method is difficult to obtain high accuracy in the case of time lag interval comparable to the time shift of the correlation peak. One problem with these methods is the effect of system noise on auto-correlation.

SUMMARY OF THE INVENTION

The invention solves the above problems by determining a three dimensional velocity of an object wherein the three dimensional velocity comprises a radial velocity and a transverse velocity. A velocity determination system receives a first signal from the object. The velocity determination system then receives a second signal from the object. The velocity determination system then correlates the first signal and the second signal. The velocity determination system determines the radial velocity based on a ratio of the correlation of the first signal and the second signal. The velocity determination system then determines a transverse velocity based on a ratio of the correlation of the first signal and the second signal in a forward mode and a backward mode along a transverse direction.

In one embodiment, the velocity determination system transmits a third signal towards the object. In some embodiments, the object comprises wind. In some embodiments, the first signal and the second signal comprise electromagnetic waves, light waves, or sound waves. In one embodiment, the velocity determination system determines a cross correlation coefficient for the first signal and the second signal. The velocity determination system then determines a ratio of the cross correlation coefficient for the first signal and the second signal.

In other embodiments, the velocity determination system combines the first signal end the second signal. In one embodiment, the velocity determination system receives one other signal from the object and correlates the combination of the first signal and the second signal with the others signal. The velocity determination system then determines the radial velocity based on a ratio of the combination of the first signal and the second signal with the other signal and determines a transverse velocity based on ratio of the correlation of the combination of the first signal and the second signal with the other signal in the forward mode and the backward mode along the transverse direction.

BRIEF DESCRIPTIONS OF THE DRAWINGS

FIG. 1 is a block diagram of a velocity determination system in an example of the invention.

DETAILED DESCRIPTION OF THE PREFERRED EMBODIMENT

Figure 2:
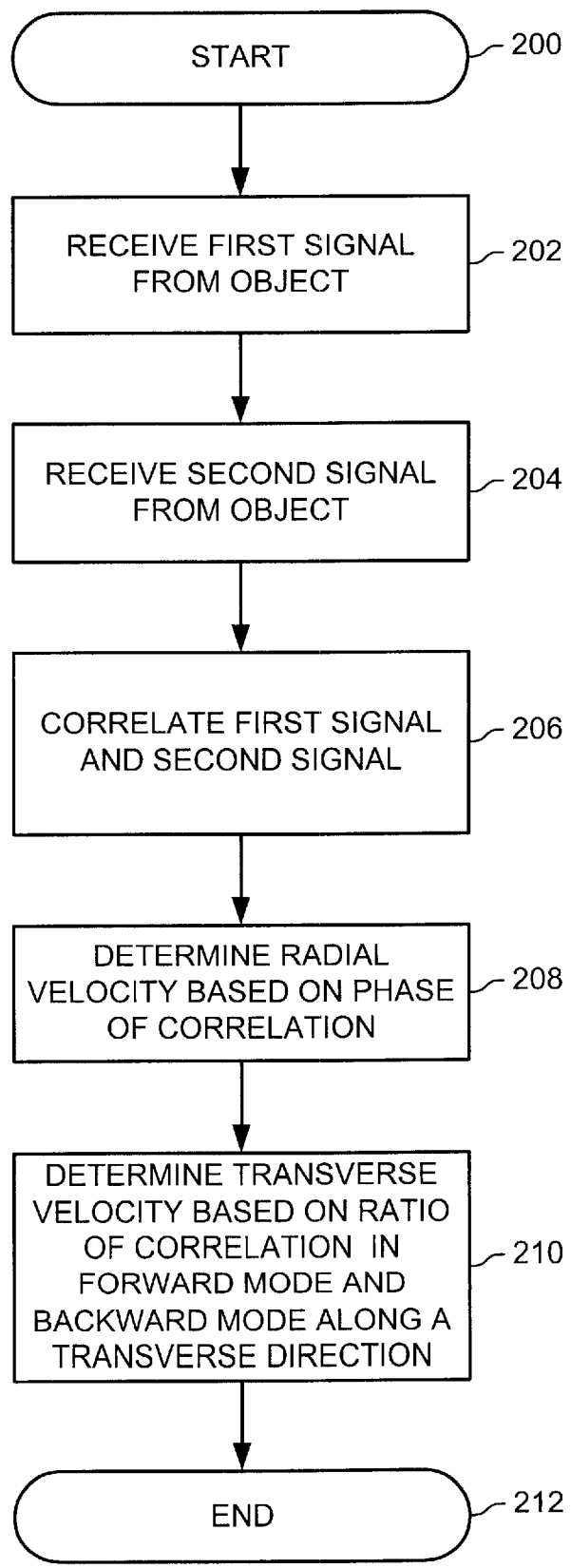
FIG. 2 is a flow chart for the velocity determination system in an example of the invention.

Velocity Determination System—FIGS. 1–2

FIG. 1 depicts a block diagram of a velocity determination system 120 in an example of the invention. FIG. 1 illustrate an object 110 and the velocity determination system 120. The velocity determination system 120 comprises a receiver system 122 and a processing system 124. The receiver system 122 is connected to the processing system 124.

The object 110 is any matter, substance, or physical body that has mass and is a solid, liquid, or gas. One example of the object 110 is wind, which include tiny particles such as air or precipitation that travel above ground. The velocity determination system 120 is any system, device, or group of devices configured to (1) receive a first signal from the object 110, (2) receive a second signal from the object 110, (3) correlate the first signal and the second signal, (4) determine the radial velocity based on a phase of the correlation of the first signal and the second signal, and (5) determine a transverse velocity based on a ratio of the correlation of the first signal and the second signal in a forward mode and backward mode along a transverse direction. The first signal and second signal are any signal or wave including but not limited to light, sound, and electromagnetic waves. One example. of the first signal and second signal is scattering.

The radial direction is the direction moving away or towards a center point. Radial velocity is the speed of the object 110 and the radial direction of the object 110. The transverse direction is a direction crosswise from the radial direction. In one example, the transverse direction is perpendicular from the radial direction. The transverse velocity is the speed of the object 110 and the transverse direction of the object 110. The forward mode is any mode that has a positive time lag from the receiver along the transverse direction. The backward mode is any mode that has a negative time lag from the receiver along the transverse direction.

The receiver system 122 is any system, device, or group of devices configured to receive a first signal from the object 110 and receive a second signal from the object 110. In one embodiment, the receiver system 122 comprises an antenna and receiver circuitry. The processing system 124 is any system, device, or group of devices configured to correlate the first signal and the second signal, determine the radial velocity based on a phase of the correlation of the first signal and the second signal, and determine a transverse velocity based on a ratio of the correlation of the first signal and the second signal in a forward mode and backward mode along a transverse direction. In one embodiment, the receiver system 122 and the processing system 124 are included with one device.

FIG. 2 depicts a flow chart for the velocity determination system 120 in an example of the invention. FIG. 2 begins in step 200. In step 202, the velocity determination system 120 receives the first signal from the object 110. In step 204, the velocity determination system 120 receives the second signal from the object 110. The velocity determination system 120 then correlates the first signal and the second signal in step 206. In step 208, the velocity determination system 120 determines the radial velocity based on a phase of the correlation of the first signal and the second signal. In step 210, the velocity determination system 120 determines a transverse velocity based on a ratio of the correlation of the first signal and the second signal in a forward mode and backward mode along a transverse direction. FIG. 2 ends in step 212.

Velocity Determination System with Multi-level Processing—FIGS. 3–10C

FIGS. 3–10C disclose embodiments of the invention, but the invention is not restricted to the configuration provided below. Those skilled in the art will appreciate numerous variations in call center system configuration and operation that are within the scope of the invention. Those skilled in the art will also appreciate how the principles illustrated in this example can be used in other examples of the invention. A particular reference number in one figure refers to the same element in all of the other figures.

Figure 3:
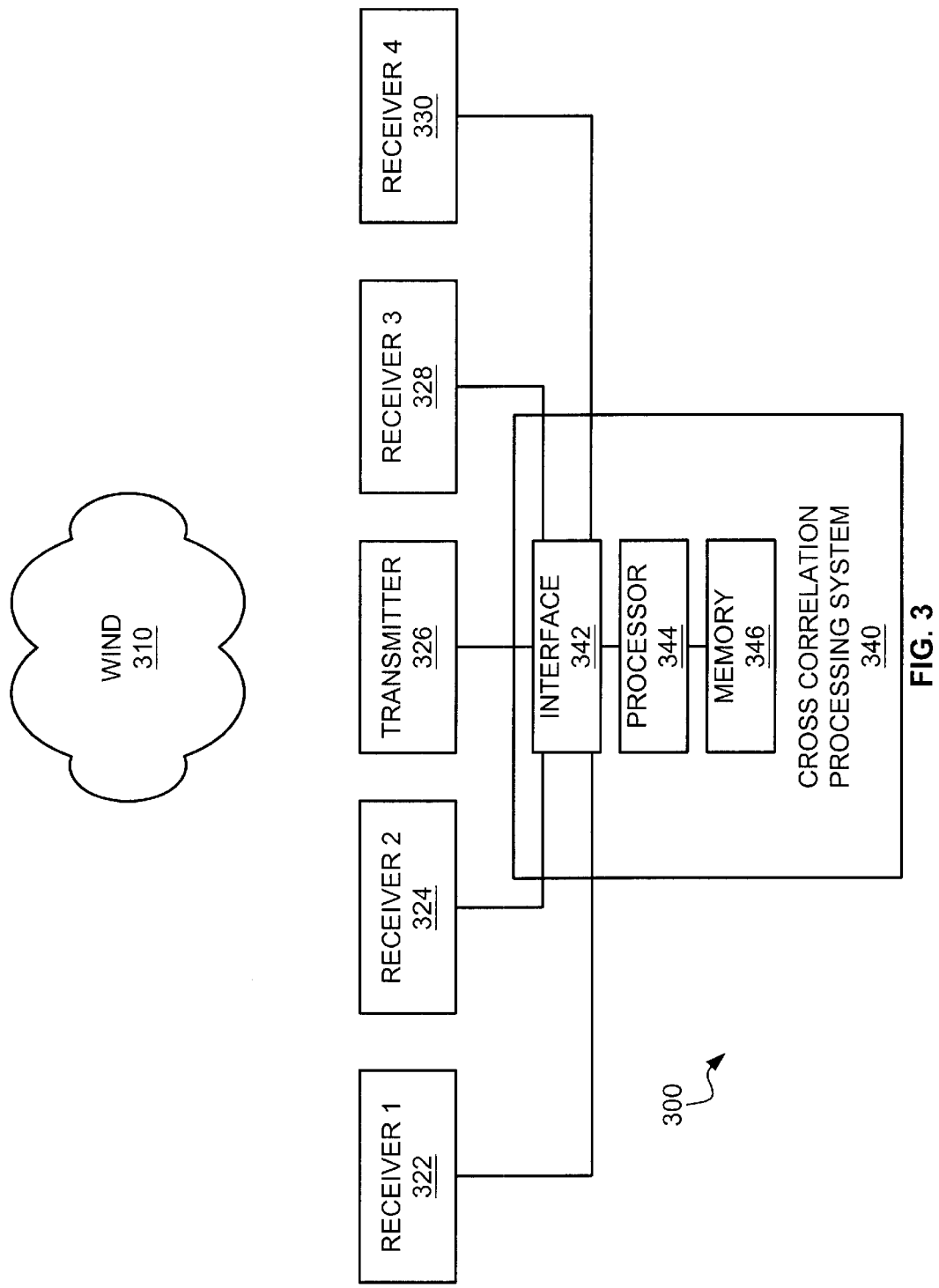
FIG. 3 is a block diagram of a multiple antenna profiler radar (MAPR) in an example of the invention.

FIG. 3 depicts a block diagram of a multiple antenna profiler radar (MAPR) 300 in an example of the invention. The MAPR 300 comprises a receiver 1 322, a receiver 2 324, a transmitter 326, a receiver 3 328, a receiver 4 330, and a cross correlation processing system 340. The cross correlation processing system 340 comprises an interface 342, a processor 344, and a memory 346. The memory 346 is connected to the processor 344. The processor 344 is connected to the interface 342. The interface 342 is connected to the receiver 1 322, the receiver 2 324, the transmitter 326, the receiver 3 328, and the receiver 4 330.

The memory 326 is any temporary and/or permanent storage of data or instructions that the processor 344 may execute. The interface 342 is any device or system configured to exchange signals between the processor 344 and the receiver 1 322, the receiver 2 324, the transmitter 326, the receiver 3 328, and the receiver 4 330.

Figure 4:
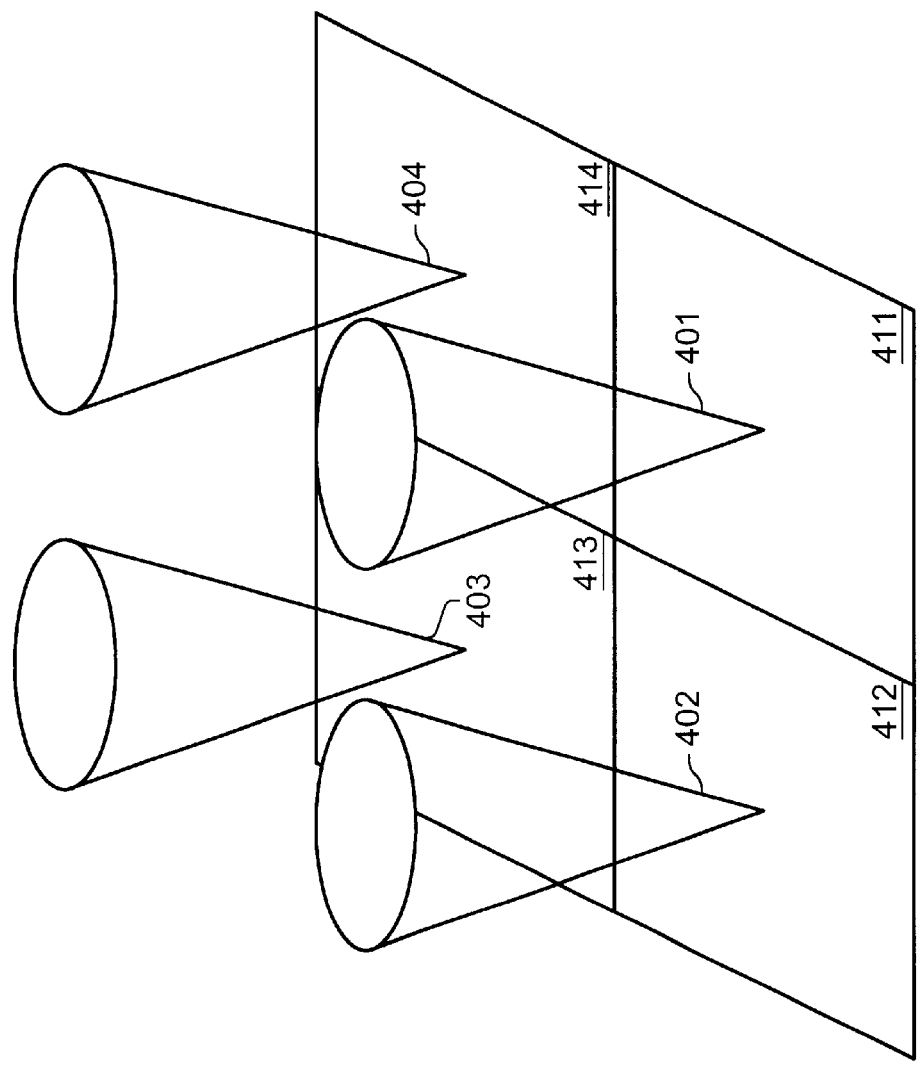
FIG. 4 is an illustration of sub-arrays for the MAPR in an example of the invention.

FIG. 4 depicts sub-arrays for the MAPR in an example of the invention. The sub-arrays 401–404 are geographic regions that cover the range of the respective receivers 322, 324, 328, and 330. The vertically pointing sub-arrays 401–404 respectively correspond to regions 411–414. As the atmosphere moves over regions 411–414, the MAPR measures the wind over the sub-arrays 401–404. The receiver 1 322 receives signals from the sub-array 401 in region 1 411. The receiver 2 324 receives signals from the sub-array 402 in region 2 412. The receiver 3 328 receives signals from the sub-array 403 in region 3 413. The receiver 4 330 receives signals from the sub-array 404 in region 4 414. In one embodiment, the signals are atmospheric echoes.

Figure 5:
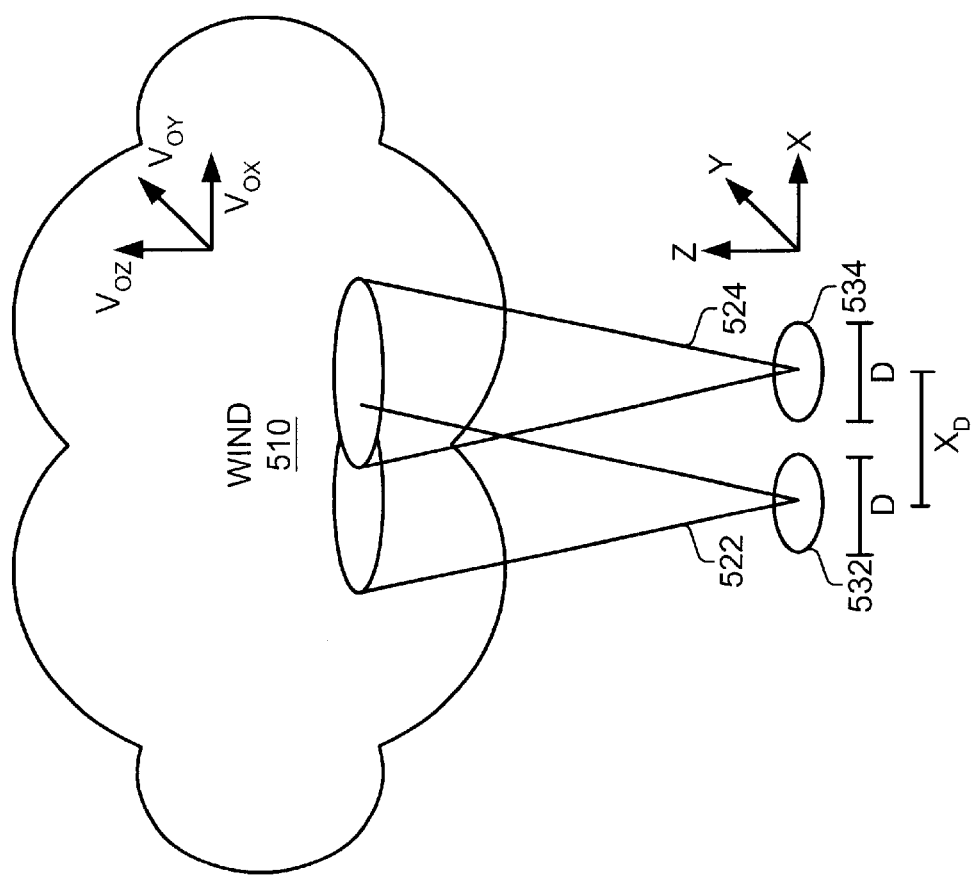
FIG. 5 is an illustration for wind, two sub-arrays, and two antennas in an example of the invention.

FIG. 5 depicts an illustration for wind 510, two sub-arrays 522 and 524, and two antennas 532 and 534 in an example of the invention. In FIG. 5, only two of the four antennas and sub-arrays of FIG. 3 and FIG. 4 are shown for the sake of simplicity. In other embodiments, numerous antennas and sub-arrays can be used to measure the wind 510. The wind 510 is moving with a velocity of v. The velocity v is represented by the radial velocity of $v_z$ and the transverse velocity of $v_x$ and $v_y$. The antennas 532 and 534 have a receiver aperture size of D. The distance between the antennas 522 and 524 is $x_D$.

In operation, the transmitter 326 transmits radio pulses towards the wind 310. The radio pulses interact with the wind 310, which creates reflected radiation signals. The receivers 322, 324, 328, and 330 then receive these reflected radiation signals. The interface 342 transfers the reflected radiation signals from the receivers 322, 324, 328, and 330 to the processor 344. The processor 344 then processes the reflected radiation signals as follows.

The processor 344 determines the cross correlation coefficient for two spaced receivers. The following equation is for the cross correlation coefficient:

$$C_{12}(\tau)=\exp(-\alpha^2(x_d/2-v_{0x}\tau)^2-\alpha^2(y_d/2-v_{0y}\tau)^2-(z_d-v_{0z}\tau)^2/(8\sigma_r^2)-2(k\sigma_v\tau)^2+2ikv_{0z}\tau)$$

where $\alpha=2\pi\gamma/D$, which is inversely proportional to the scale of the interference pattern;

$\tau$ is the time lag between receivers;

$\gamma$ is the antenna efficiency;

D is the receiver aperture antenna size;

$v_{0x}$ and $v_{0y}$ are the transverse velocity;

$v_{0z}$ is the radial velocity;

$x_d$ and $y_d$ are the distance between the two receivers;

$z_d$ is the distance between the two range sample volume;

$\sigma_r$ is the range resolution; and $\sigma_v$ is the standard derivation of the velocity.

The processor 344 then determines the radial velocity based on the equations below. The processor 344 determines a ratio of cross correlation coefficients that eliminates the turbulence term $2(k\sigma_v v)^2$. The equations below show a logarithm of the ratio of cross correlation coefficients:

$$\ln|C_{12}(\tau)|/|C_{12}(-\tau)| = \alpha^2 2\Delta x v_{0x}\tau \text{ for tranverse wind; and}$$

$$\ln|C_{12}(\tau)|/|C_{12}(-\tau)| = \frac{z_d v_{0z}\tau}{(2\sigma_r^2)} \text{ for radial wind.}$$

The processor 344 then determines the transverse velocity along the x is direction from the slope of the logarithm of the cross correlation ratio. The processor 344 then determines the transverse velocity in the y direction with the same calculation of the transverse velocity as described above except in the y direction. The processor 344 determines the turbulence from the magnitude of the cross correlation coefficient at $x_d=2v_{0x}\tau$ and $y_d=2v_{0y}\tau$, so the antenna separation is equal to that the medium moves during the time lag $\tau$, which minimizes the transverse wind effects. This embodiment advantageously combines the Doppler methodology with the interferometry technique.

In one embodiment, the cross-correlation processing system 340 performs multi-level processing to increase the signal to noise ratio. In first level processing, the processor 344 processes six pairs of regions. Four pairs are (region 1, 2), (2, 3), (3, 4), and (1,4) with a separation of d. The remaining two pairs are (region 1, 3) and (2, 4) with a separation of a square root of √2d.

Figure 6B:
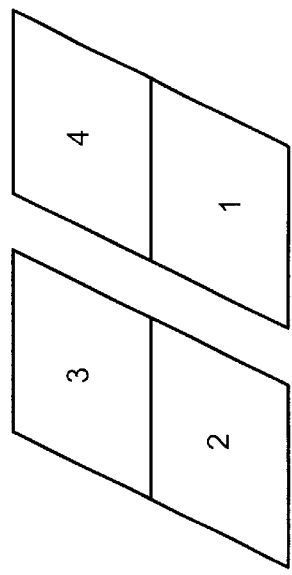
FIGS. 6A–6D is an illustration of pairs of regions for second level processing and third level processing in an example of the invention.
Figure 6D:
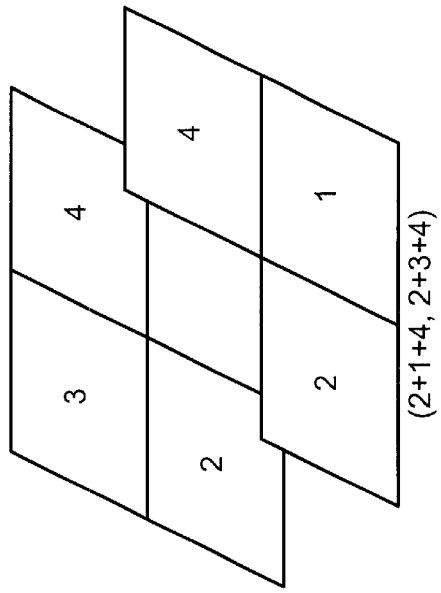
Figure 6A:
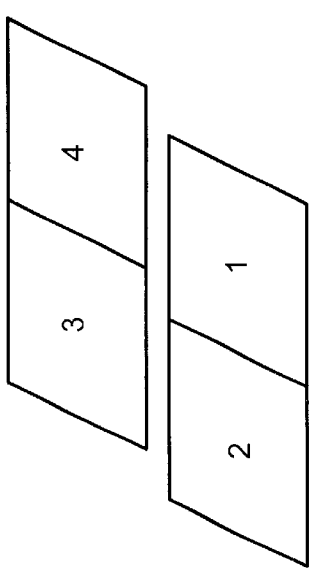

FIGS. 6A and 6B depict pairs of regions for second level processing in an example of the invention. FIG. 6A depicts a first pair of second level processing in an example of the invention. For second level processing, the processor 344 processes 2 pairs of regions with a separation of d. In FIG. 6A, the complex signals of regions 1 and 2 are combined, and the complex signals of regions 3 and 4 are combined. The combined signal for regions 1 and 2 are then correlated with the combined signal for region 3 and 4. FIG. 6B depicts a second pair of second level processing in an example of the invention. In FIG. 6B, the complex signals of regions 2 and 3 are combined, and the complex signals of regions 1 and 4 are combined. The combined signal for regions 2 and 3 are then correlated with the combined signal for regions 1 and 4.

Figure 6C:
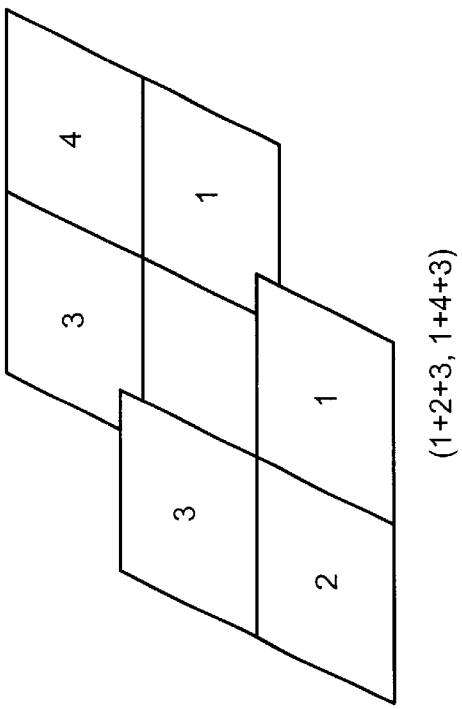

FIGS. 6C and 6D depict pairs of regions for third level processing in an example of the invention. For third level processing, the processor 344 processes two pairs of regions with a separation of √2d/3. Once again, the complex signals are combined prior to correlation. In FIG. 6C, the complex signals of regions 1, 2 and 3 are combined, and the complex signals of regions 1, 4, and 3 are combined. The combined signal for regions 1, 2, and 3 are then correlated with the combined signal for regions 1, 4 and 3. In FIG. 6D, the complex signals of regions 2, 1 and 4 are combined, and the complex signals of regions 2, 3, and 4 are combined. The combined signal for regions 2, 1, and 4 are then correlated with the combined signal for regions 2, 3 and 4. Since signals add coherently while noise adds incoherently, the second level processing increases the SNR by 3 dB. The third level processing increases the SNR by 5 dB.

Figure 7A:
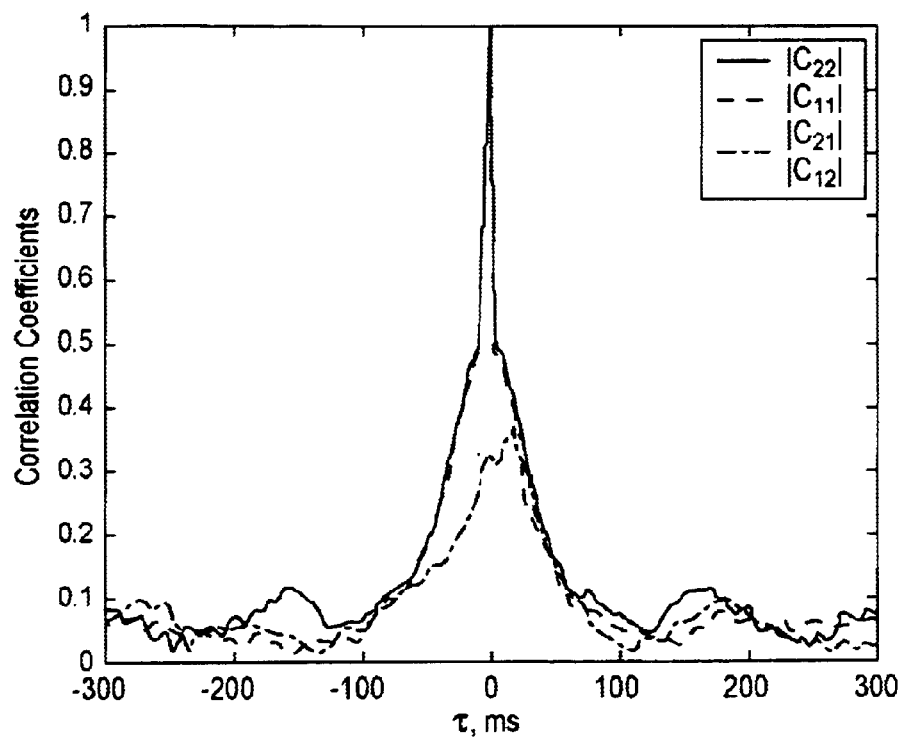
FIG. 7A is a graph of time lag, $\tau$, vs. correlation coefficients in an example of the invention.
Figure 7B:
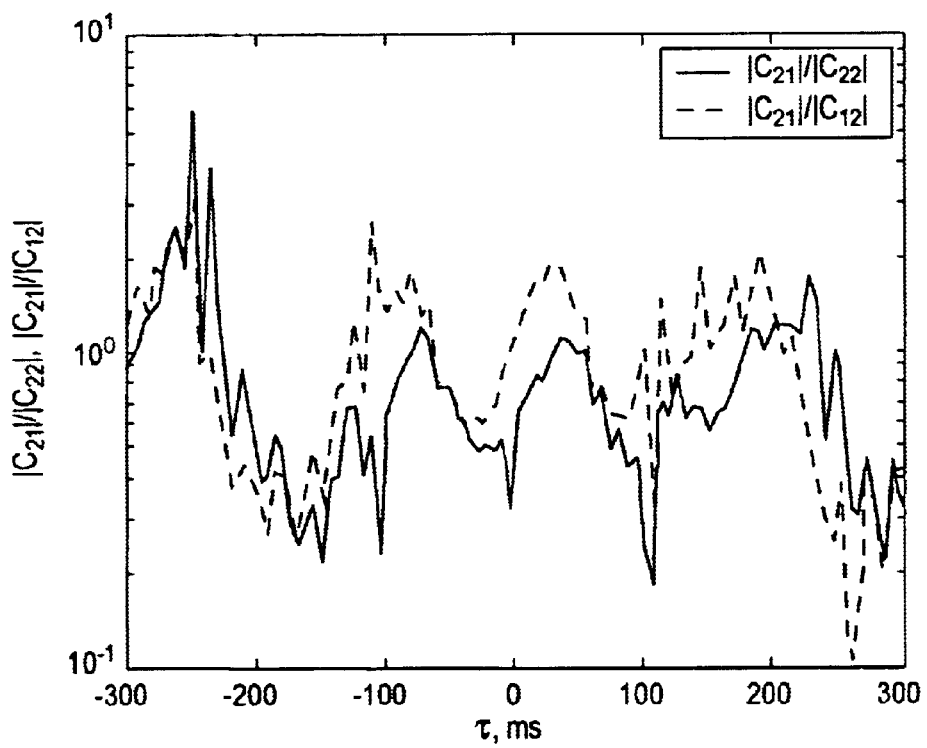
FIG. 7B is a graph of time lag, $\tau$, vs. a ratio of correlation coefficients in an example of the invention.
Figure 7C:
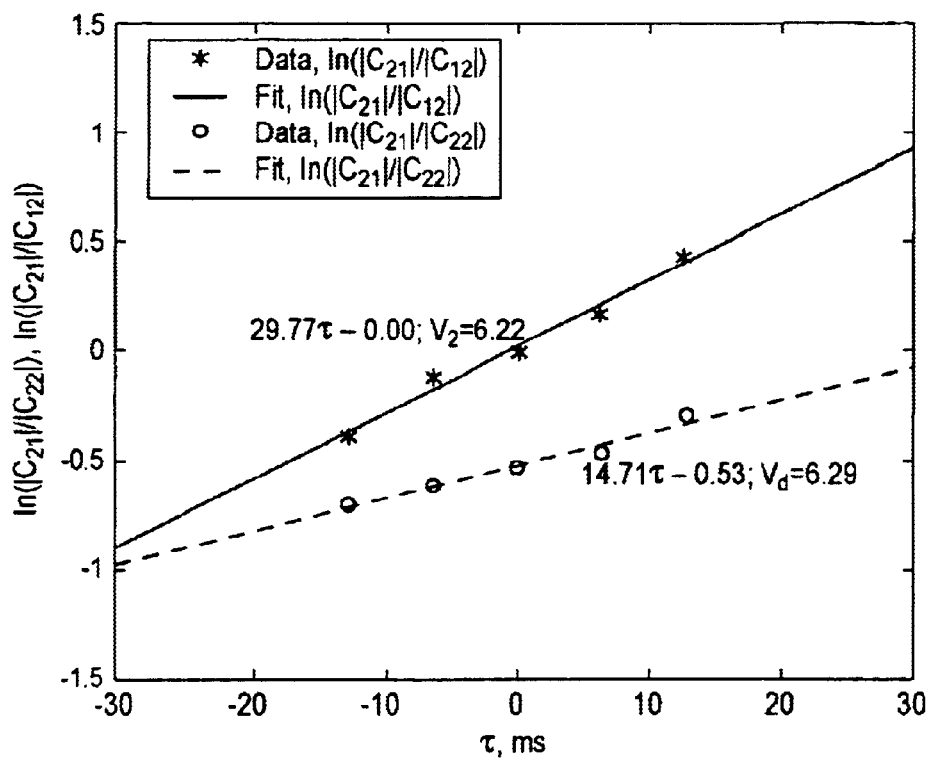
FIG. 7C is a graph of time lag, $\tau$, vs. a logarithm of ratio of correlation coefficients in an example of the invention.

FIGS. 7A–C depict graphs for first level processing. FIG. 7A depicts a graph of time lag, $\tau$, vs. correlation coefficients in an example of the invention. The graphs of time lag vs. correlation coefficients, such as FIG. 7A, plot auto- and cross-correlation as functions of time lag, $\tau$. These graphs are similar to Gaussian functions except for the sharp peak in auto-correlation, which is due to noise. FIG. 7B depicts a graph of time lag, $\tau$, vs. a ratio of correlation coefficients in an example of the invention. FIG. 7C depicts a graph of time lag, $\tau$, vs. a logarithm of ratio of correlation coefficients in an example of the invention. The graphs of time lag vs. a logarithm of ratio of correlation coefficients show linear functions which are easily fitted to obtain velocity.

Figure 8A:
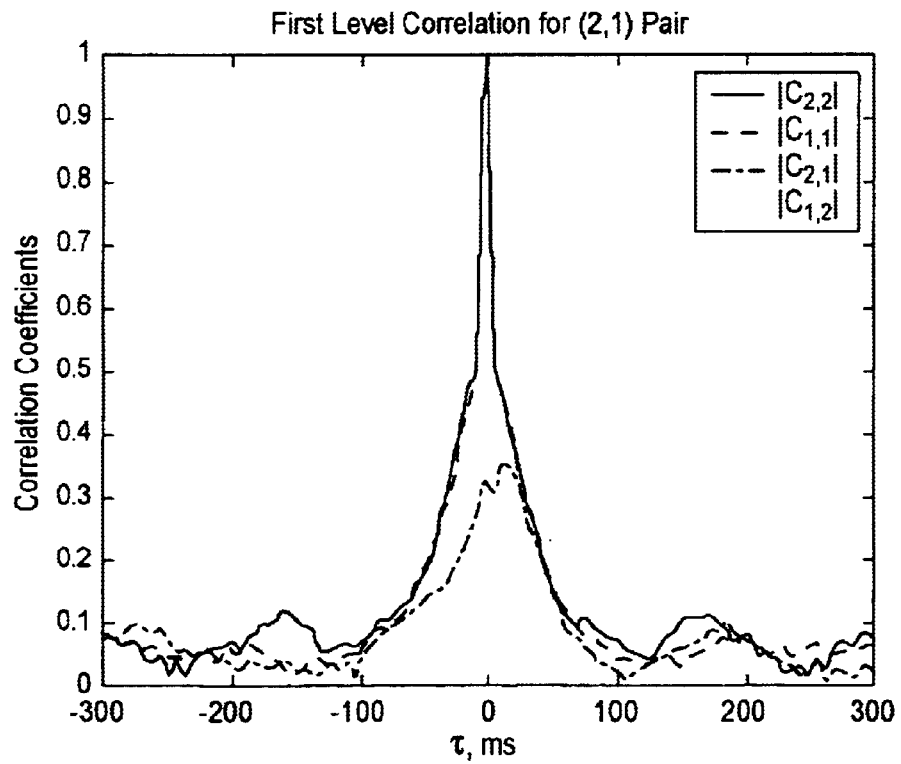
FIG. 8A is a graph of time lag, $\tau$, vs. correlation coefficients for a (region 2,1) pair in an example of the invention.
Figure 8B:
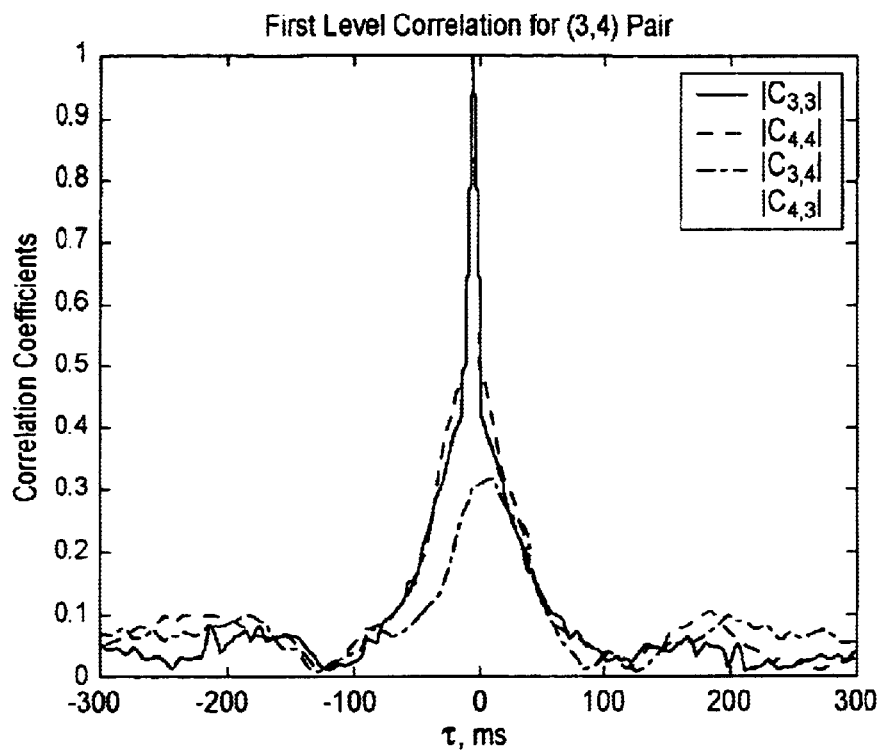
FIG. 8B is a graph of time lag, $\tau$, vs. correlation coefficients for a (region 3,4) pair in an example of the invention.
Figure 8C:
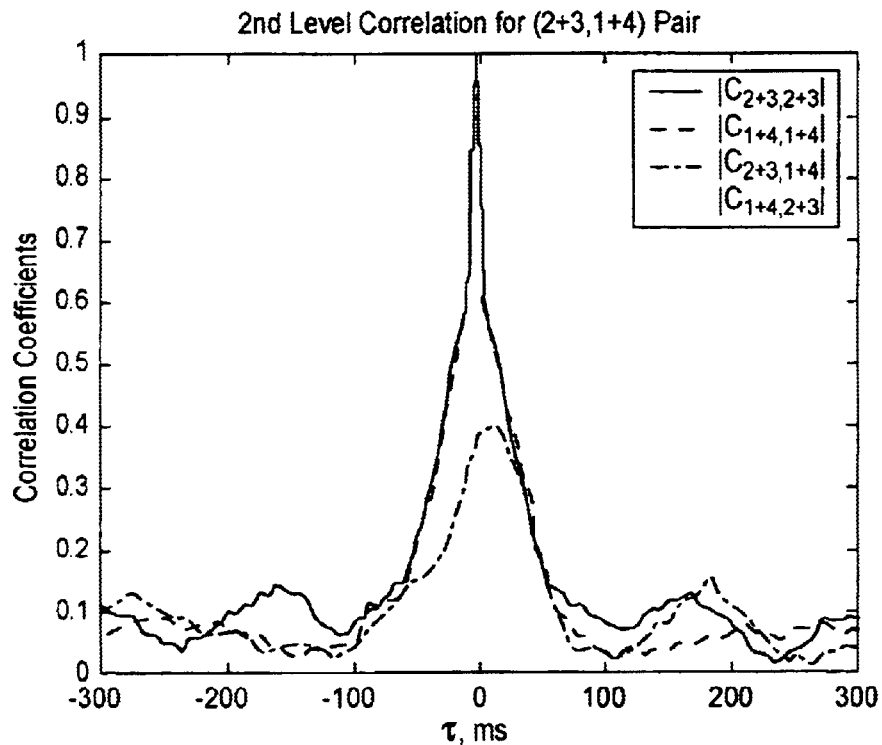
FIG. 8C is a graph of time lag, $\tau$, vs. correlation coefficients for a (region 2+1, 1+4) pair in an example of the invention.
Figure 8D:
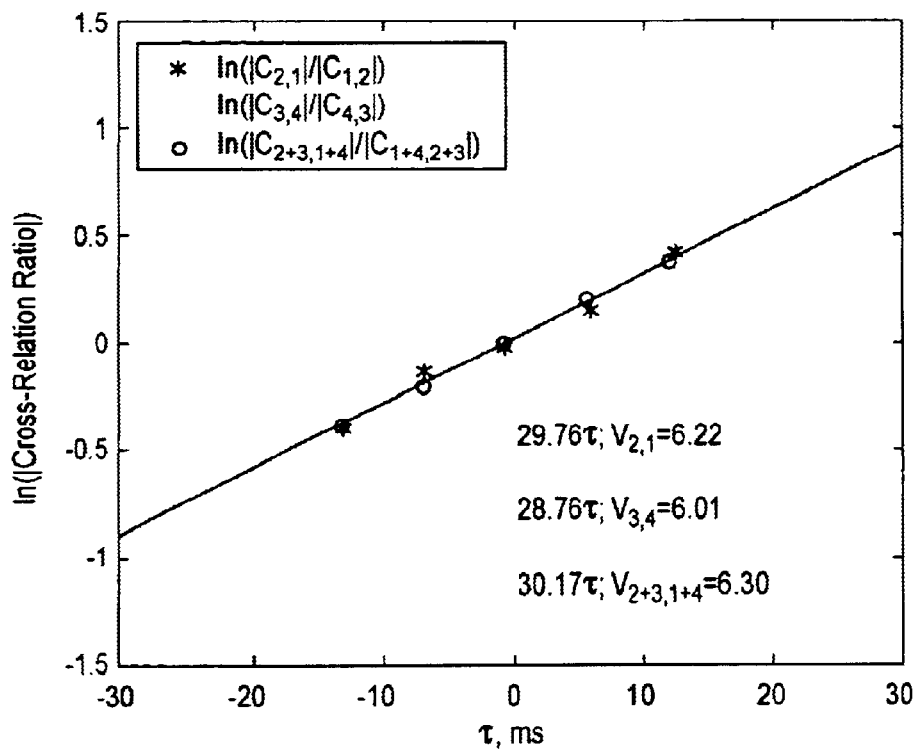
FIG. 8D is a graph of time lag, $\tau$, vs. a logarithm of ratio of correlation coefficients in an example of the invention.

FIGS. 8A–D depict graphs for second level processing. FIG. 8A depicts a graph of time lag, τ, vs. correlation coefficients for the (region 2,1) pair in an example of the invention. FIG. 8B depicts a graph of time lag, τ, vs. correlation coefficients for the (region 3,4) pair in an example of the invention. FIG. 8C depicts a graph of time lag, τ, vs. correlation coefficients for the (2+1, 1+4) pair in an example of the invention. FIG. 8D depicts a graph of time lag, τ, vs. a logarithm of ratio of correlation coefficients in an example of the invention.

Figure 9A:
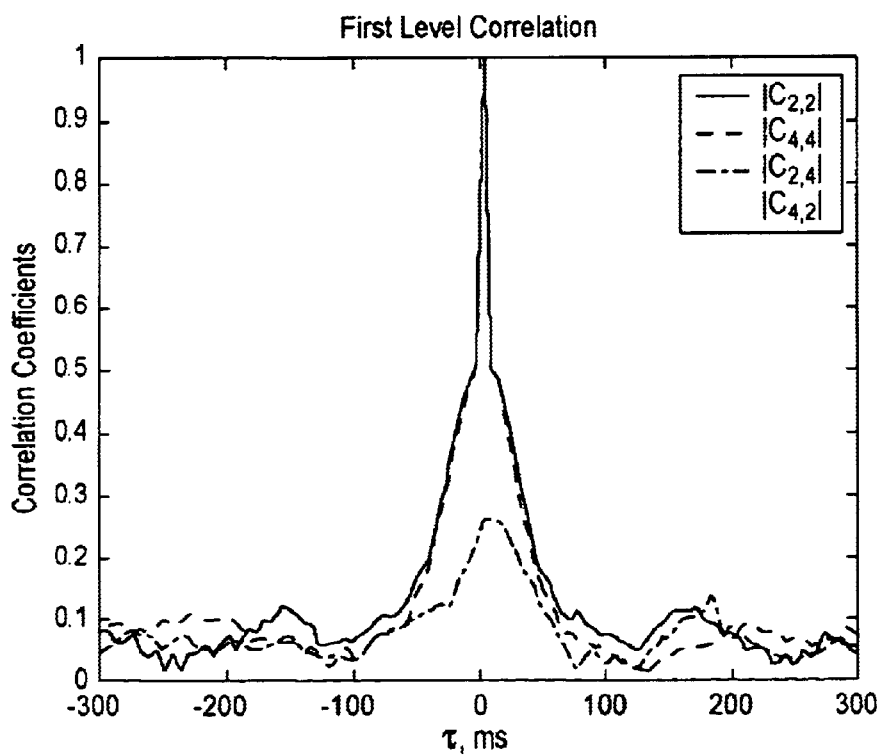
FIG. 9A is a graph of time lag, $\tau$, vs. correlation coefficients for a (region 2, 4) pair in an example of the invention.
Figure 9B:
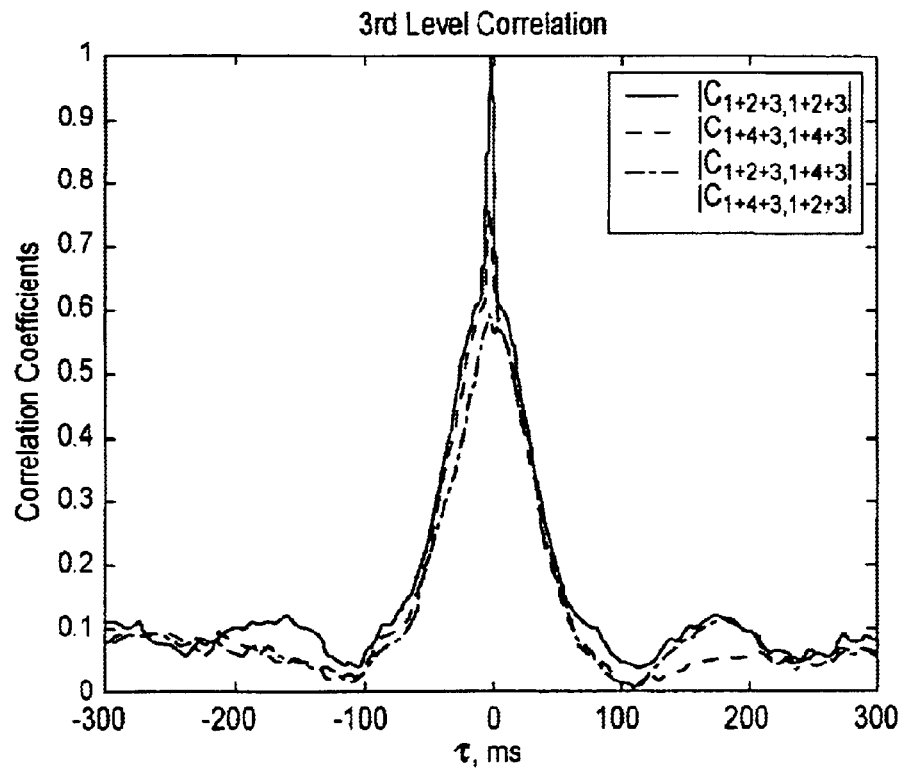
FIG. 9B is a graph of time lag, $\tau$, vs. correlation coefficients for third level correlation in an example of the invention.
Figure 9C:
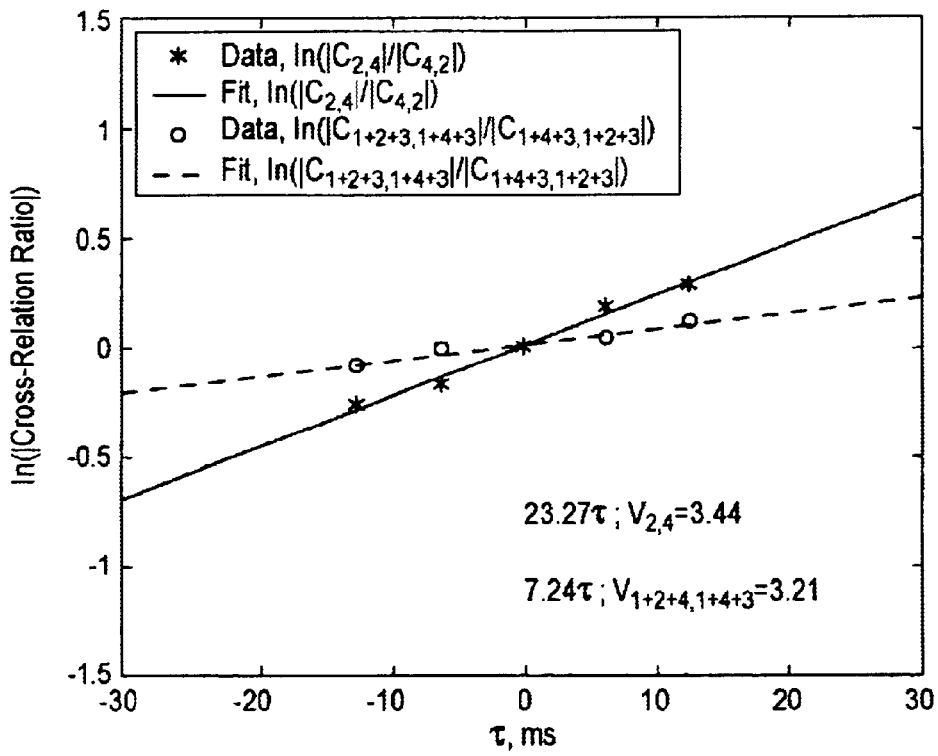
FIG. 9C is a graph of time lag, $\tau$, vs. a logarithm of ratio of correlation coefficients for third level correlation in an example of the invention.

FIGS. 9A–C depict graphs for third level processing. FIG. 9A depicts a graph of time lag, τ, vs. correlation coefficients for the (region 2, 4) pair in an example of the invention. FIG. 9B depicts a graph of time lag, τ, vs. correlation coefficients for third level correlation in an example of the invention. FIG. 9C depicts a graph of time lag, τ, vs. a logarithm of ratio of correlation coefficients for third level correlation in an example of the invention.

Figure 10A:
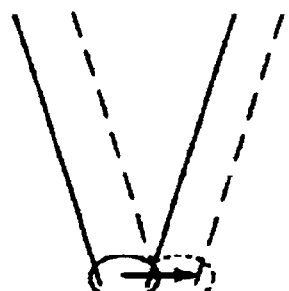
FIG. 10A is an illustration of a shift antenna beam using cross-correlation and multi-level processing in an example of the invention.
Figure 10B:
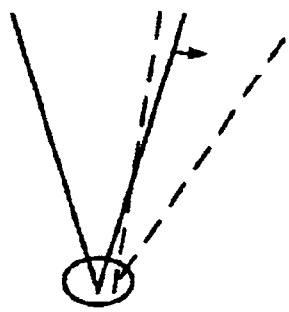
FIG. 10B is an illustration of a scanning system using cross-correlation and multi-level processing in an example of the invention.
Figure 10C:
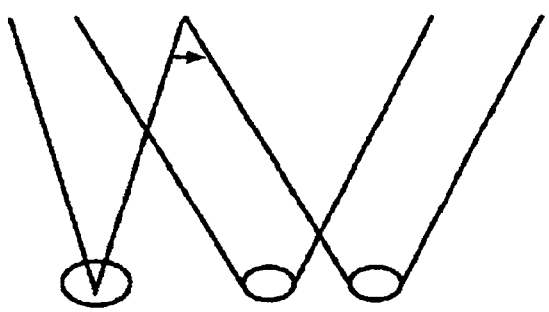
FIG. 10C is an illustration of a scanning system configuration with a spaced antenna configuration using cross-correlation and multi-level processing in an example of the invention.

FIG. 10A depicts an illustration of a shift antenna beam using cross-correlation and multi-level processing in an example of the invention. FIG. 10A depicts an alternative embodiment of the shift antenna beam configuration using cross-correlation and multi-level processing to the spaced antenna configuration discussed above. In one embodiment, the shift of the antenna beam is in the spherical coordinates. FIG. 10B depicts an illustration of a scanning system using cross-correlation and multi-level processing in an example of the invention. FIG. 10B depicts another alternative embodiment of the scanning system configuration using cross-correlation and multi-level processing to the spaced antenna configuration. FIG. 10C depicts an illustration of a scanning system with spaced antennas using cross-correlation and multi-level processing in an example of the invention. FIG. 10C depicts another alternative embodiment of the scanning system configuration using cross-correlation and multi-level processing to a spaced antenna configuration.

Figure 11:
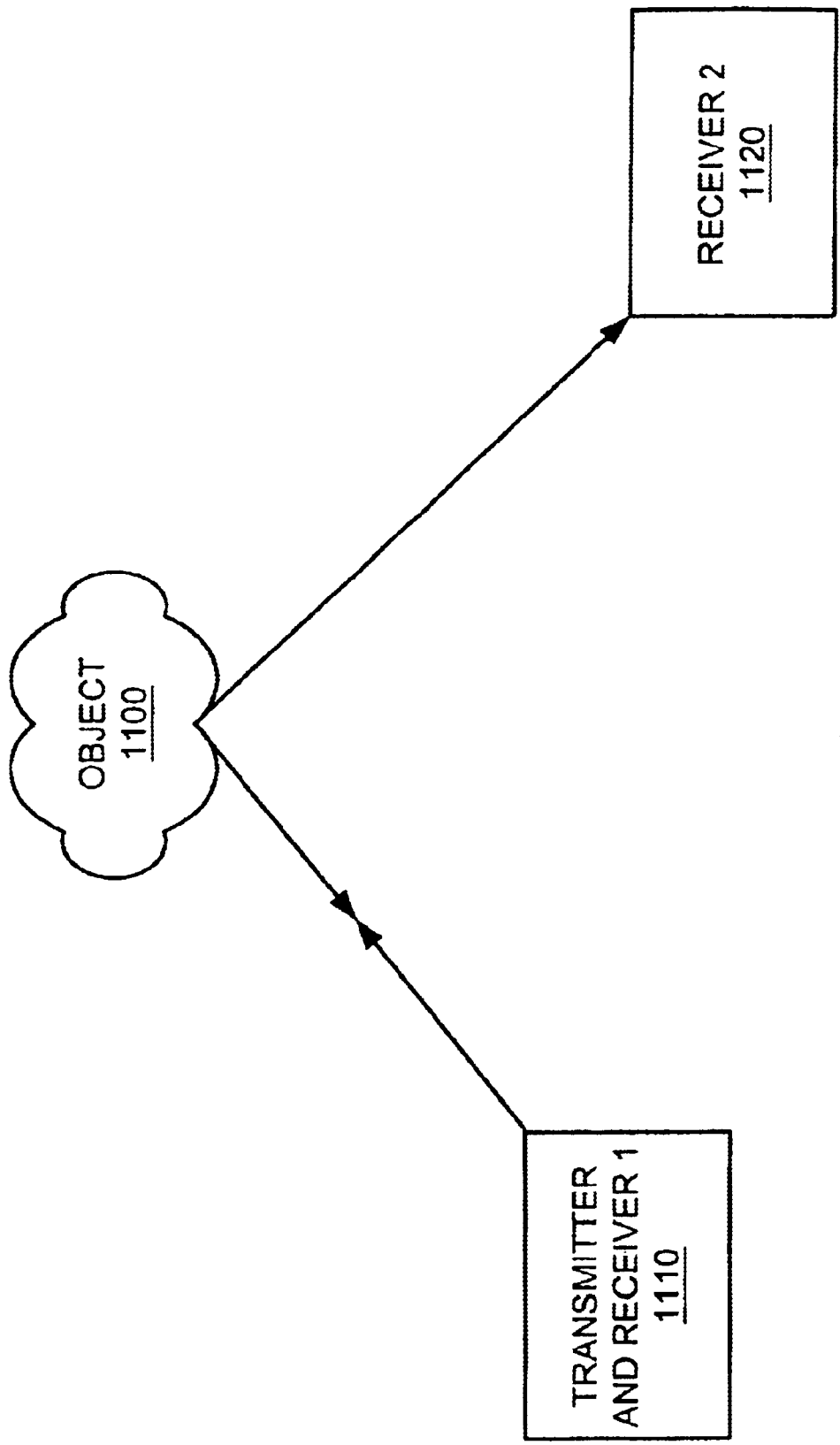
FIG. 11 is an illustration of a bi-net configuration system for angular correlation function in an example of the invention.

Angular Correlation Function—FIG. 11

In one embodiment, the cross-correlation processing system 340 performs an angular correlation function to determine velocity. The angular correlation function is the correlation between two wave fields received at different directions corresponding to two incident waves, respectively. The phase of the angular correlation function represents the path difference between the two waves.

FIG. 11 depicts an illustration of a bi-net configuration system in an example of the invention. The transmitter and receiver 1 1110 transmits a signal towards the object 1100. After the initial signal interacts with the object 1100, the transmitter and receiver 1 1110 and the receiver 2 1120 receive two respective signals from the object 1100.

The two respective signals received by the transmitter and receiver 1 1110 and the receiver 2 1120 are defined as:

$$E_1(t) = \sum_{l=1}^{N} f_l \exp(j(\bar{k}_i - \bar{k}_{s1}) \cdot \bar{r}_l) = \sum_{l=1}^{N} f_l \exp(j(\bar{k}_i - \bar{k}_{s1}) \cdot (\bar{r}_{0l} + \bar{v}_l t))$$

$$E_2(t) = \sum_{l=1}^{N} f_l \exp(j(\bar{k}_i - \bar{k}_{s2}) \cdot \bar{r}_l) = \sum_{l=1}^{N} f_l \exp(j(\bar{k}_i - \bar{k}_{s2}) \cdot (\bar{r}_{0l} + \bar{v}_l t))$$

The time correlation of the two signals are then:

$$B_1(T_S) = <E_1(t) * E_1(t + T_S)> = \sum_{l=1}^{N} |f_l|^2 e^{j(\bar{k}_i - \bar{k}_{s1}) \cdot \bar{v}_0 T_S} C_1(\sigma_v)$$

$$B_2(T_S) = <E_2(t) * E_2(t + T_S)> = \sum_{l=1}^{N} |f_l|^2 e^{j(\bar{k}_i - \bar{k}_{s2}) \cdot \bar{v}_0 T_S} C_1(\sigma_v)$$

The angular correlation function is defined as:

$$\Gamma(T_S) = <E_1(t) * E_2(t + T_S)> = \sum_{l=1}^{N} |f_l|^2 e^{j(\bar{k}_{s1} - \bar{k}_{s2}) \cdot (\bar{r}_{0l} + \bar{v}_0 t)} e^{j(\bar{k}_{s1} - \bar{k}_{s2}) \cdot \bar{v}_0 T_S} C_\Gamma(\sigma_v)$$

The fourth moment of the angular correlation function is:

$$ACF_4(T_S) = <E_1(t) * E_1(t + T_S) E_2(t) E_2(t + T_S) *> = \sum_{l=1}^{N} |f_l|^4 e^{j(\bar{k}_{s1} - \bar{k}_{s2}) \cdot (\bar{v}_0 T_S)} C_{\Gamma_4}(\sigma_v)$$

The scattering angles for the two signals are $\angle(\bar{k}_i, \bar{k}_{s1}) = \theta_1$ and $\angle(\bar{k}_i, \bar{k}_{s2}) = \theta_2$.
The angle between the two scattering direction is $\angle(\bar{k}_{s1}, \bar{k}_{s2}) = \theta_d$.

The phases of the time correlations and the angular correlation function then are:

$$\phi_1 = phase(B_1) = \frac{4\pi}{\lambda} \sin\frac{\theta_1}{2} v_1 T_S$$

$$\phi_2 = phase(B_2) = \frac{4\pi}{\lambda} \sin\frac{\theta_2}{2} v_2 T_S$$

$$\phi_3 = phase(\Gamma_4) = \frac{4\pi}{\lambda} \sin\frac{\theta_d}{2} v_3 T_S$$

The three components of velocity can then be determined as:

$$v_1 = \frac{\lambda \phi_1}{4\pi \sin\frac{\theta_1}{2} T_S}$$

$$v_2 = \frac{\lambda \phi_2}{4\pi \sin\frac{\theta_2}{2} T_S}$$

$$v_3 = \frac{\lambda \phi_3}{4\pi \sin\frac{\theta_d}{2} T_S}$$

The velocities, $v_1$, $v_2$, and $v_3$, are in the directions of $\bar{k}_i - \bar{k}_{s1}$, $\bar{k}_i - \bar{k}_{s2}$, and $\bar{k}_{s1} - \bar{k}_{s2}$, respectively. Since $\theta_1$ and $\theta_2$ are usually large for backward scattering, the maximum measureable velocity components $v_1$ and $v_2$ are limited by the pulse repeatation time $T_s$ due to phase aliasing. The velocity component $v_3$ does not have this limitation due to the angle $\theta_d$ can be very small.

The use of angular correlation advantageously distinguishes particle type. Since the velocity in the direction $\bar{k}_{s1} - \bar{k}_{s2}$ can be calculated from $v_1$, and $v_2$ obtained from self-correlation. The self-correlation function is power weighted, while the fourth moment of the angular correlation function is power square weighted. The difference between the velocity from the self-correlation and the angular correlation function distinguishes between individual scatterers and randomly distributed scatterers.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor, and storage media.

Those skilled in the art will understand that the preferred embodiments described above may be subjected to apparent modifications without departing from the true scope and spirit of the invention. The inventors, accordingly, hereby state their intention to rely upon the Doctrine of Equivalents, in order to protect their full rights in the invention.

We claim:

1. A method of determining a three dimensional velocity of an object wherein the three dimensional velocity comprises a radial velocity and a transverse velocity, the method comprising:

receiving at least three signals from the object; combining the at least three signals with each other into at least two pairs of combined signals;

correlating the at least two pairs of the combined signals;

determining the radial velocity based on the correlation of the at least two pairs of the combined signals; and determining a transverse velocity based on the correlation of the at least two pairs of the combined signals.

2. The method of claim 1 wherein the object comprises wind.

3. The method of claim 1 wherein the at least three signals comprise electromagnetic waves.

4. The method of claim 1 wherein the at least three signals comprise light waves.

5. The method of claim 1 wherein the at least three signals comprise sound waves.

6. The method of claim 1 wherein correlating the at least two pairs of the combined signals determining a cross correlation coefficient for the at least two pairs of the combined signals.

7. The method of claim 6 wherein correlating the at least two pairs of the combined signals comprises determining a ratio of the cross correlation coefficient for the at least two pairs of the combined signals.

8. The method of claim 7 wherein correlating the at least two pairs of the combined signals comprises determining a logarithm of the ratio of the cross correlation coefficient for the at least two pairs of the combined signals.

9. A velocity determination system for determining a three dimensional velocity of an object wherein the three dimensional velocity comprises a radial velocity and a transverse velocity, the velocity determination system comprising:

a processor configured to receive at least three signals from the object, combine the at least three signals with each other into at least two pairs of combined signals, correlate the at least two pairs of the combined signals, determine the radial velocity based on the correlation of the at least two pairs of the combined signals, and determine a transverse velocity based on the correlation of the at least two pairs of the combined signals; and an interface connected to the processor and configured to transfer the at least three signals from the object to the processor.

10. The velocity determination system of claim 9 wherein the object comprises wind.

11. The velocity determination system of claim 9 wherein the at least three signals comprise electromagnetic waves.

12. The velocity determination system of claim 9 wherein the at least three signals comprise light waves.

13. The velocity determination system of claim 9 wherein the at least three signals comprise sound waves.

14. The velocity determination system of claim 9 wherein the processor is configured to determine a cross correlation coefficient for the at least two pairs of the combined signals.

15. The velocity determination system of claim 14 wherein the processor is configured to determine a ratio of the cross correlation coefficient for the at least two pairs of the combined signals.

16. The velocity determination system of claim 15 wherein the processor is configured to determine a logarithm of the ratio of the cross correlation coefficient for the at least two pairs of the combined signals.

17. A software product for determining a three dimensional velocity of an object wherein the three dimensional velocity comprises a radial velocity and a transverse velocity comprising:

velocity determination software operational when executed by a processor to direct the processor to receive at least three signals from the object, combine the at least three signals with each other into at least two pairs of combined signals, correlate the at least two pairs of the combined signals, determine the radial velocity based on the correlation of the at least two pairs of the combined signals, and determine a transverse velocity based on the correlation of the at least two pairs of the combined signals; and a software storage medium operational to store the velocity determination system software.

18. The software product of claim 17 wherein the object comprises wind.

19. The software product of claim 17 wherein the at least three signals comprise electromagnetic waves.

20. The software product of claim 17 wherein the at least three signals comprise light waves.

21. The software product of claim 17 wherein the at least three signals comprise sound waves.

22. The software product of claim 17 wherein the velocity determination software is operational when executed by the processor to direct the processor to determine a cross correlation coefficient for the at least two pairs of the combined signals.

23. The software product of claim 22 wherein the velocity determination software is operational when executed by the processor to direct the processor to determine a ratio of the cross correlation coefficient for the at least two pairs of the combined signals.

24. The software product of claim 23 wherein the velocity determination software is operational when executed by the processor to direct the processor to determining a logarithm of the ratio of the cross correlation coefficient for the at least two pairs of the combined signals.

25. A method of determining a velocity of an object, the method comprising:

receiving a first signal and a second signal from the object;

correlating the first signal and the second signal using a positive time lag to generate a forward mode correlation;

correlating the first signal and the second signal using a negative time lag to generate a backward mode correlation;

determining a ratio of the forward mode correlation and the backward mode correlation; and determining the velocity of the object based on the ratio of the forward mode correlation and the backward mode correlation.

26. The method of claim 25 wherein the velocity comprises transverse velocity.

27. The method of claim 25 wherein the velocity comprises radial velocity.

28. The method of claim 25 wherein the object comprises wind.

29. The method of claim 25 wherein determining the velocity comprises determining the velocity based on a slope of the ratio.

30. The method of claim 25 wherein receiving the first signal and the second signal comprises receiving the first signal and the second signal using one antenna.

31. The method of claim 30 wherein receiving the first signal and the second signal comprises receiving the first signal and the second signal from different directions.

32. A velocity determination system for determining a velocity of an object, the velocity determination system comprising:

an interface configured to receive a first signal and a second signal from the object; and a processor coupled to the interface and configured to correlate the first signal and the second signal using a positive time lag to generate a forward mode correlation, correlate the first signal and the second signal using a negative time lag to generate a backward mode correlation, determine a ratio of the forward mode correlation and the backward mode correlation, and determine the velocity of the object based on the ratio of the forward mode correlation and the backward mode correlation.

33. The velocity determination system of claim 32 wherein the velocity comprises transverse velocity.

34. The velocity determination system of claim 32 wherein the velocity comprises radial velocity.

35. The velocity determination system of claim 32 wherein the object comprises wind.

36. The velocity determination system of claim 32 wherein the processor is configured to determine the velocity based on a slope of the ratio.

37. The method of claim 32 the interface is configured to use one antenna to receive the first signal and the second signal.

38. The method of claim 37 wherein the one antenna is configured to receive the first signal and the second signal from different directions.

39. A software product for determining a velocity of an object wherein a first signal and a second signal are received from the object, the software product comprising:

velocity determination software configured to direct a processor to correlate the first signal and the second signal using a positive time lag to generate a forward mode correlation, correlate the first signal and the second signal using a negative time lag to generate a backward mode correlation, determine a ratio of the forward mode correlation and the backward mode correlation, and determine the velocity of the object based on the ratio of the forward mode correlation and the backward mode correlation; and a software storage medium operational to store the velocity determination software.

40. The software product of claim 39 wherein the velocity comprises transverse velocity.

41. The software product of claim 39 wherein the velocity comprises radial velocity.

42. The software product of claim 39 wherein the object comprises wind.

43. The software product of claim 39 wherein the velocity determination software is configured to direct the processor to determine the velocity based on a slope of the ratio.

44. The software product of claim 39 wherein one antenna is used to receive the first signal and the second signal.

45. The software product of claim 39 wherein the one antenna is configured to receive the first signal and the second signal from different directions.

* * * * *

UNITED STATES PATENT AND TRADEMARK OFFICE
CERTIFICATE OF CORRECTION

PATENT NO. : 6,721,678 B1
DATED : April 13, 2004
INVENTOR(S) : Guifu Zhang et al.

It is certified that error appears in the above-identified patent and that said Letters Patent is hereby corrected as shown below:

<u>Title page,</u>
Insert Item -- [73] Assignee: University Corporation for Atmospheric Research, Boulder, CO (US) --

Signed and Sealed this

Twenty-seventh Day of July, 2004

JON W. DUDAS
*Acting Director of the United States Patent and Trademark Office*